(12) United States Patent
Fredriksson et al.

(10) Patent No.: US 7,934,039 B2
(45) Date of Patent: Apr. 26, 2011

(54) VARIABLE OSCILLATOR FOR GENERATING DIFFERENT FREQUENCIES IN A CONTROLLER AREA NETWORK

(75) Inventors: Lars-Berno Fredriksson, Kinna (SE); Kent Lennartsson, Mölndal (SE)

(73) Assignee: Xinshu Management, L.L.C., Dover, DE (US)

( * ) Notice: Subject to any disclaimer, the term of this patent is extended or adjusted under 35 U.S.C. 154(b) by 238 days.

(21) Appl. No.: 12/267,190

(22) Filed: Nov. 7, 2008

(65) Prior Publication Data

US 2009/0063909 A1 Mar. 5, 2009

Related U.S. Application Data (63) Continuation of application No. 11/163,622, filed on Oct. 25, 2005, now Pat. No. 7,472,216.

(30) Foreign Application Priority Data

Oct. 25, 2004 (SE) .................................. 0402573

(51) Int. Cl.
*G06F 1/00* (2006.01)
(52) U.S. Cl. ........................ 710/305; 713/501
(58) Field of Classification Search .................. 710/305; 713/501
See application file for complete search history.

(56) References Cited

U.S. PATENT DOCUMENTS

| | | | |
|---|---|---|---|
| 3,676,794 A * | 7/1972 | Bidell et al. ..................... | 331/11 |
| 3,706,854 A * | 12/1972 | Dickson et al. ................ | 370/252 |
| 3,723,898 A * | 3/1973 | Tewksbury ...................... | 331/4 |
| 4,893,271 A | 1/1990 | Davis et al. | |
| 5,418,526 A | 5/1995 | Crawford | |
| 5,436,936 A * | 7/1995 | Haapanen ....................... | 375/371 |
| 5,455,931 A | 10/1995 | Camporese et al. | |
| 5,483,230 A | 1/1996 | Mueller | |
| 6,161,190 A | 12/2000 | Fischer et al. | |
| 6,559,783 B1 | 5/2003 | Stoneking | |
| 6,611,227 B1 | 8/2003 | Nebiyeloul-Kifle et al. | |
| 6,842,808 B2 | 1/2005 | Weigl et al. | |
| 6,853,292 B1 | 2/2005 | Kramer et al. | |
| 6,954,818 B2 | 10/2005 | Kent | |
| 7,171,576 B2 | 1/2007 | McDevitt et al. | |
| 7,228,450 B2 | 6/2007 | Fuehrer et al. | |
| 7,472,216 B2 | 12/2008 | Fredriksson et al. | |
| 2003/0058882 A1 | 3/2003 | Fleury | |
| 2004/0120356 A1 | 6/2004 | Davenport et al. | |
| 2005/0180442 A1 | 8/2005 | Birsan et al. | |

FOREIGN PATENT DOCUMENTS

WO 99/25097 A1 5/1999

OTHER PUBLICATIONS

Steve Corrigan, "Introduction to the Controller Area Network (CAN)," Texas Instruments Application Report SLOA101—Aug. 2002, 17 pages.
Office Action issued in German Patent Application No. 10 2005 046350.9 dated Dec. 21, 2009.

\* cited by examiner

*Primary Examiner* — Paul R Myers
(74) *Attorney, Agent, or Firm* — Fitch, Even, Tabin & Flannery (57) ABSTRACT

A device suitable for use as a module in a Controller Area Network (CAN) system with a bus or connection includes relatively simple and inexpensive components, including an oscillator that generates a number of different frequencies in response to directions from a microcomputer. A CAN Controller receiving the frequencies is connected to the bus via a transceiver. The device has utility for verification and validation work in association with a CAN system.

36 Claims, 8 Drawing Sheets

VARIABLE OSCILLATOR FOR GENERATING DIFFERENT FREQUENCIES IN A CONTROLLER AREA NETWORK

The application is a Continuation of application Ser. No. 11/163,622 filed Oct. 25, 2005, now U.S. Pat. No. 7,472,216 issued Dec. 30, 2008, which claims priority from SE 0402573-0 filed Oct. 25, 2004, the entire contents of all are hereby incorporated by reference.

BACKGROUND

This disclosure relates to a device that is operationally and functionally suitable for inclusion in a module in a (Controller Area Network) CAN system with CAN connection.

Specifying, verifying and validating CAN systems with the object of obtaining sufficient information to ensure reliable functioning throughout the whole life of a system is already known. In association with this, reference is made to instruments of various kinds that are available on the market for analysing CAN buses, for example CANalyzer from Vector Informatik GmbH, X-analyser from Warwick Technologies Ltd, and CANlab from Accurate Technologies Inc., all of which are PC-based software that, in conjunction with various CAN/PC interfaces from Kvaser AB, for example LAPcan, can retrieve, timestamp and send messages and error frames on the bus in order to determine the appearance in relation to time of messages on the bus and if and when errors appear. In addition, there are other instruments, for example CAN Scope from Vector Informatik that can measure voltage levels on the CAN bus as a function of the time and, using the rules of the CAN protocol, can display an interpreted image in which the voltage levels are displayed as CAN bits. There are also conventional oscilloscopes incorporating corresponding interpretation. Kvaser markets a product, Memorator, by means of which a large number of messages can be time stamped and saved for later analysis.

A well-known problem is that CAN Controllers (CCs) can only be set to certain bit times determined by the frequency of the oscillator that clocks the CC. For example, 1 Mbit/s can not be set at all with a 13 MHz or 33 MHz clock frequency, while with a 12 MHz frequency only the sample points 50% and 66.67% can be selected. For data communication in general, oscillators are required with great precision, often 500 ppm down to 20 ppm. For example, the USB standard demands at least 500 ppm precision and USB components often demand tighter tolerances, for example Philips recommends 50 ppm for its ISP1761 USB host controller. The requirement for precision in the CAN standard ISO 11898 is dependent upon Phase_Seg1, Phase_Seg2, SJW, and the bit time. There is thus a difference between the requirement for oscillator precision in a data communication system such as USB and a control system such as CAN. In the former, the precision is given by the specification, while in the latter, it is dependent upon the system construction in an individual system. In communication between a CAN bus and a computer, the communication takes place via an interface. The communication between the interface and the computer often takes place via a serial data communication that demands a precise oscillator frequency, for example USB with 12 MHz and 50 ppm.

It is common in known instruments that they do not have a validation function, whereby the various respective CAN settings and oscillators of the modules connected to a CAN bus can be controlled. There is also a need for a unit forming a CAN module to be able to be connected to the CAN system and to be used for various target and indication cases and, for example, to be used as the source in the system for interpretation and initiation of various functions in the CAN system. The unit must, for example, be able to be connected as a source of interference in the system in association with testing. The unit must be able to be sold as separate to the CAN module or corresponding individual connectable unit. The unit must also be able to work with components that are constructed and function in a simple way. The unit must be able to work with connections of various types (topologies), preferably bus connections but also with optical connections, star-wired connections and/or network connections.

SUMMARY

In order to solve the basic problem of being able to adapt a CAN module containing a microprocessor to any CAN bit time, an oscillator is introduced with variable clock frequency that clocks the CC and a reference frequency that can be compared with the variable clock frequency. The source of the reference frequency can be a crystal oscillator or it can be obtained indirectly from messages on the CAN bus by measuring how many clock cycles the message takes up from Start Of Frame to the acknowledgement bit and comparing this with a theoretically derived value.

There is thus a need for devices that can solve the abovementioned problem, using their own microcomputer or together with a high-level computer. Embodiments of this disclosure solve all or parts of this problem and, in connection with this, indicates new ways of looking at the CAN bus and its function.

Embodiments in this disclosure work principally with a CC, a CAN Transceiver (CT), an oscillator with variable frequency, a CPU with associated memories and peripherals and a reference frequency. To obtain the reference frequency indirectly, embodiments of this disclosure utilizes protocol rules according to CAN (ISO 11898-1) and indication of the SOF and ACK bits in the CAN messages. In particular, the protocol's rules are utilized for the construction of a CAN message on the bus. For certain purposes, one or more counters are also utilized. This disclosure also relates to a method for enabling a module to adjust automatically to a system's bit rate.

The principal characteristics of a device according to this disclosure are that it comprises an oscillator that, in response to directions from an associated microcomputer, generates a number of different frequencies and also comprises a CAN Controller utilizing the frequencies that is connected or can be connected to the connection via a transceiver.

Further developments of the concept of this disclosure are apparent from the following subsidiary claims.

In accordance with an embodiment, CAN messages can only occur in CAN Controllers. A transmitting CAN Controller generates pulses at TTL level on its TX connection to a CAN transceiver that amplifies these to a pulse train on the bus. The CAN transceivers of receiving modules read off the pulse train on the bus and convert these to pulses at TTL level and display these on the RX connection of the respective connected CAN Controllers. The CAN Controller interprets the pulses according to the CAN protocol and determines whether they represent a correct CAN message or not.

This approach leads to the recognition that it is possible to construct a device with a CAN transceiver, a CAN Controller, a variable oscillator and a microprocessor as the main components, which among other things can generate pulses and pulse trains on the bus and can also analyse pulses and pulse trains on the bus according to the rules of the CAN protocol and determine within which limits the pulse train on the bus can be interpreted as correct CAN messages, when Error Flags are to be generated and when a pulse on the CAN connection is to be disregarded. The new way of thinking is that CAN messages only occur in CAN Controllers. A transmitting CAN Controller generates pulses at TTL level on its TX connection to a CAN transceiver that amplifies these to a pulse train on the bus. The CAN transceivers of receiving modules read off the pulse train on the bus and convert these to pulses at TTL level and display these on the RX connection of the respective connected CAN Controllers. The CAN Controller interprets the pulses according to the CAN protocol and determines whether they represent a correct CAN message or not.

This new way of thinking leads to the recognition that it is possible to constructs device with a CAN transceiver, a CAN Controller, a variable oscillator and a microprocessor as the main components, which can generate varying pulses and pulse trains on a CAN connection in order to stimulate and activate the CC of other modules connected to the connection and also to analyse pulses and pulse trains on the bus according to the rules of the CAN protocol and determine within which limits the pulse train on the bus can be interpreted as correct CAN messages or Error Flags.

BRIEF DESCRIPTION OF THE DRAWINGS

Embodiments of the disclosure are described below with reference to the attached drawings in which.

DETAILED DESCRIPTION

Figure 1:
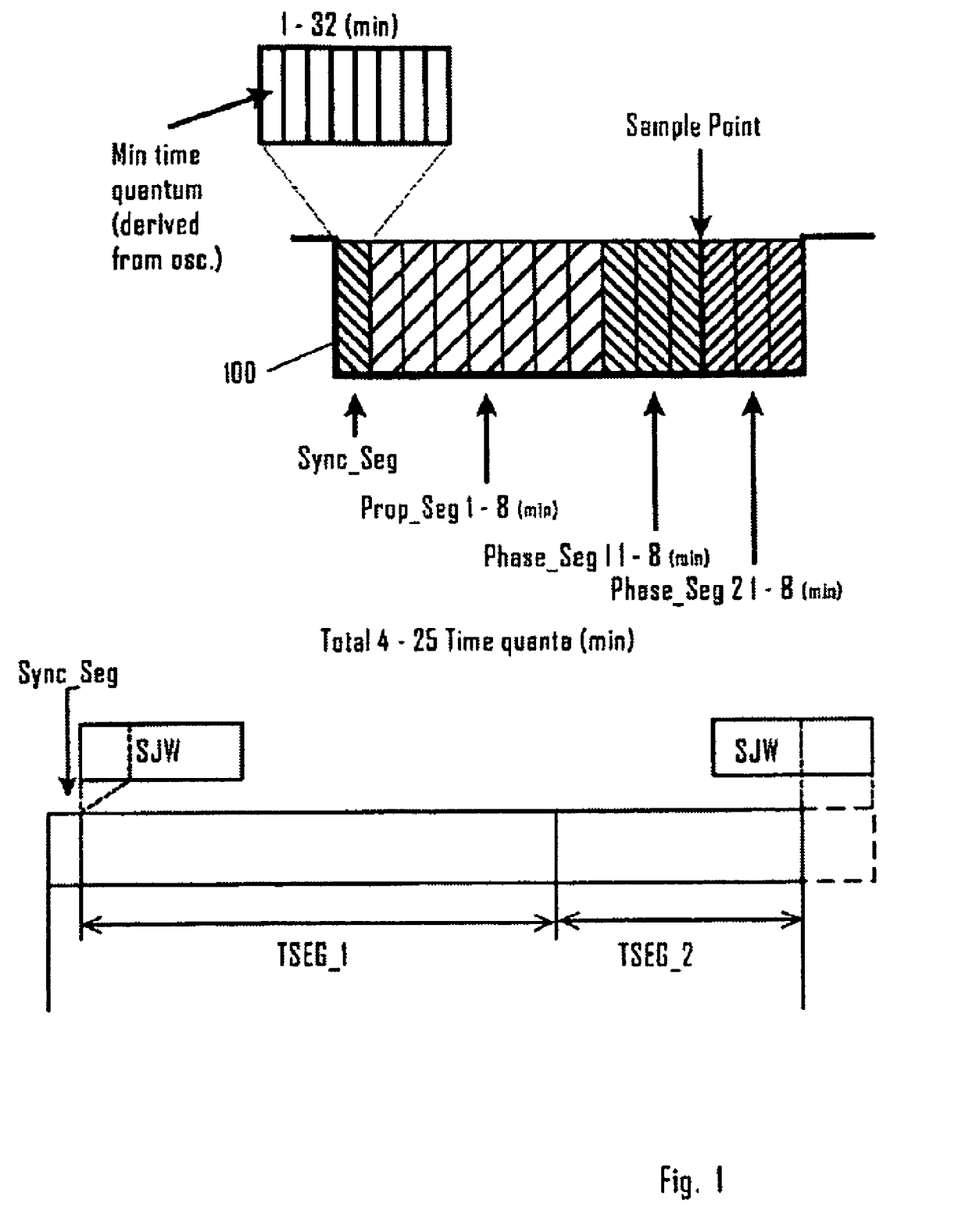
FIG. 1 shows the construction of bits and bit segments in a CAN system.

In order to facilitate the understanding of this disclosure, the construction of a CAN bit 100 is shown in FIG. 1. It is constructed of a number of bit quanta, BTQ, that are generated by an oscillator whose frequency is broken down by a prescaler and divided into Synchronization Segment (Sync_Seg), Propagation Segment (Prop_Seg), Phase Segment 1 (Phase_Seg 1) and Phase Segment 2 (Phase_Seg 2), or alternatively into Sync_Seg, Time Segment 1 (TSEG_1) and Time Segment 2 (TSEG_2). According to the rules for CAN, the symbol 0 is dominant over 1. In addition, a maximum of five consecutive symbols of the same value can be transmitted, after which at least one symbol of opposite value must be transmitted. If six or more symbols of the same type are to be transmitted, an extra symbol of opposite type is inserted, so-called bit stuffing. For signalling, the Non Return to Zero (NRZ) method is used, that is consecutive symbols of the same value are identified by dead reckoning. A free bus has the continual value 1. A message is introduced by a zero, Start of Frame (SOF). The falling edge on changing from 1 to 0 at SOF is utilized for synchronization of all the connected CCs. These are then re-synchronized at each falling edge in the following bit sequence in a message. Sync Jump Width (SJW) is the maximum number of BTQ that can be used for adjusting the bit length during resynchronization. During resynchronization TSEG_1 is shortened or TSEG_2 is lengthened by the requisite number of BTQ, however at most SJW. The CAN protocol places requirements on CCs' oscillators connected to a system. Their frequency $f_{osc}$ must not deviate from a nominal frequency $f_{nom}$ by more than df according to the following, where all the conditions must be fulfilled:

1) $[(1-df)*f_{nom} \cdot f_{osc} \cdot (1+df)*f_{nom}]$
2) $df \square \{(Phase\_Seg1, Phase\_Seg2)_{min}/[2*(13*T_b - Phase\_Seg2)]\}$
3) $df \square (SJW/20*T_b)$, where $T_b$ is nominal bit time.

As can be seen from the above, the tolerance requirement for a module's oscillator frequency is dependent upon the CAN Controller's setting and the current signal delays. For more detailed information refer to ISO 11898-1. This disclosure also relates to a method for enabling a module to adjust automatically to a system's bit rate.

Figure 2:
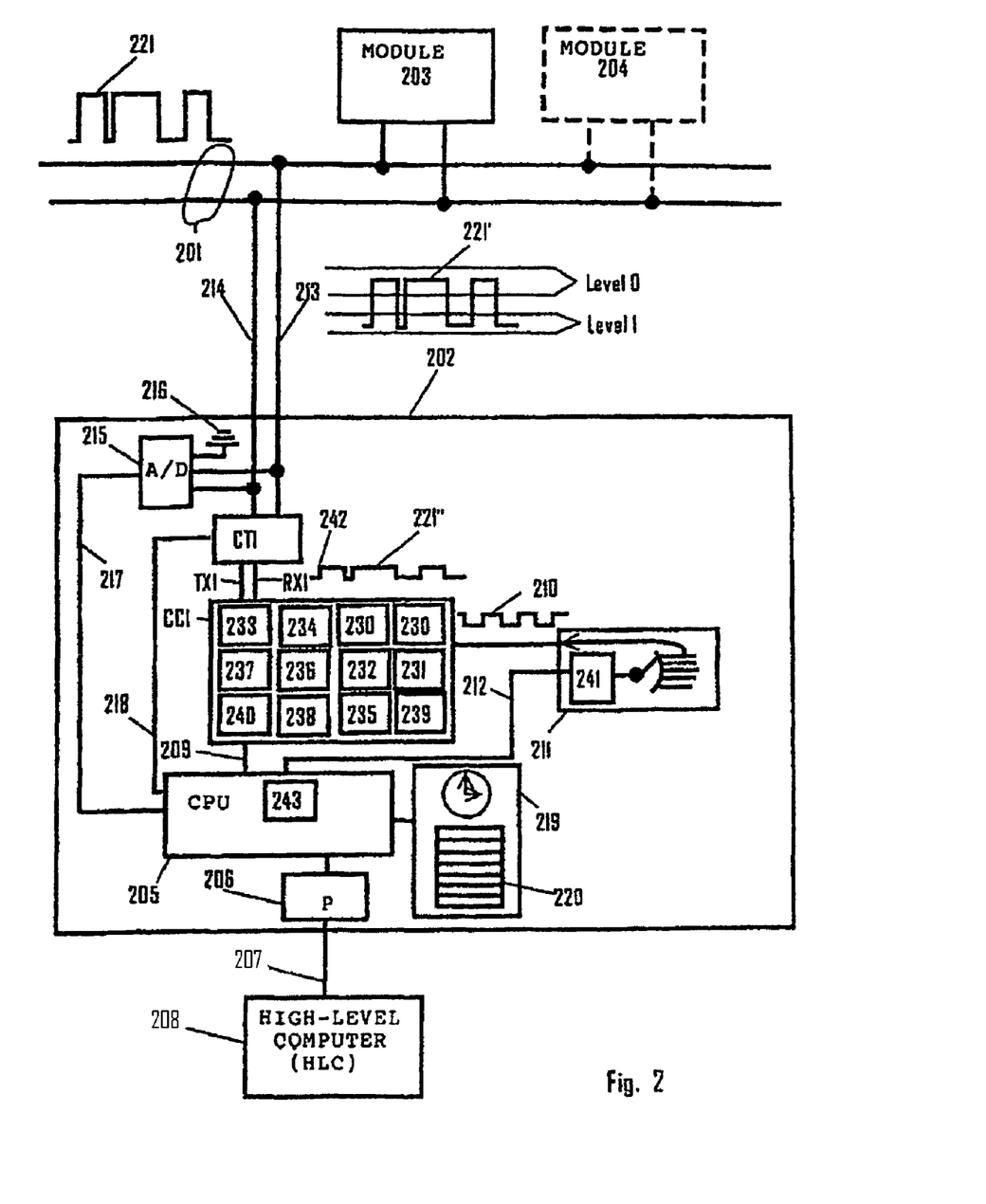
FIG. 2 shows in the form of block diagram the construction of a CAN module with the new components that can be connected to CAN systems that comprise a connection (for example a bus connection) to which other CAN modules are also connected.

FIG. 2 schematically shows an embodiment. The object of device 202 and also one or more modules 203, 204 that are active on the bus are connected to a CAN connection 201. This embodiment has a microprocessor 205 with requisite peripherals 206 and can be connected via a connection 207 to a high-level computer 208, for example a PC, via a USB connection. The microprocessor is connected to the CAN Controller CC1 via the connection 209. The CAN Controller contains a state machine 230 that operates according to rules for CAN 231, an error counter 232, transmission logic 233 that generates outgoing pulses, bit time logic 234 that, among other things, determines the sample point and bit end, a configuration register 235, message queues for incoming 236 and outgoing 237 messages, a filter 238, a clock generator 239 and a communication device 240 for communication with the microprocessor. CC1 is clocked by a clock frequency 210, generated by the variable oscillator 211. Using the program 243, the microprocessor sets the oscillator's 211 frequency via the connection 212 and the setting logic 241. CC1 is connected to the CAN transceiver CT1 via the transmission connection TX1 and the reception connection RX1. CT1 is connected to the CAN bus 201 via the CAN High connection 213 and the CAN Low connection 214. These are also connected to the AD-transducer 215 that can measure the potential of the respective connections in relation to the earth reference potential 216. The microprocessor can read off the AD-transducer via the connection 217 and can thereby not only ascertain the change of level on the bus, but also measure the deviations in potential of other transmitting modules relative to the earth reference 216. Using the program 243, the microprocessor can also set CT1 in active or listen only mode via the connection 218. In listen only mode, CC1 signals on TX1 are prevented from going out on the bus 201 but are returned to RX1. The microprocessor has also one or more clock functions 219 with counter and capture register 220. Pulse trains 221 appear on the bus. Each such pulse train, 221' changes between two differential voltage levels, level 0 (Level 0) and level 1 (Level 1). CT1 receives a pulse train 221' and displays it on CC1's RX input RX1 at TTL level 221".

The pulse train is now interpreted by CC1 according to the rules for CAN. The first change 242 from level 1 to level 0 is interpreted as SOF if level 0 still applies at the sample point, otherwise the change is disregarded. If the level after SOF is still 0 at the next sample point, the first bit in the CAN identifier is recorded as 0. If it changed to level 1, the bit is recorded as 1, and so on. In the event of transmission, CC1 generates a bit pattern according to the CAN rules, that goes but as a pulse train on the connection TX1 to CT1 that sends out a corresponding pulse train on the CAN bus. Now assume that CC1 is set to a bit length that is six times longer than the value set in the modules 203 and 204 and assume that CC1 is to transmit a message where the CAN identifier starts with 1. CC1 sends out SOF to CT1, which in turn changes the CAN bus level from 1 to 0. This level persists until CC1 sends out level 1. Meanwhile, modules 203 and 204 CCs have detected a correct SOF followed by five bits with the same symbol 0 which is not in accordance with the bit stuffing rules of the CAN protocol, for which reason they transmit an error flag. It will now be recognized that with the approach that a CC generates and interprets pulse trains on the CAN bus via a CT according to its local setting and the rules of the CAN protocol, it is possible with an apparatus according to the description to generate pulses and pulse trains to a bus with CC1 and CT1 by the application of the CAN rules, which pulses and pulse trains are received and interpreted differently by other modules connected to the bus according to the same CAN rules. In addition, by receiving pulse trains from other modules, it is possible to determine within which setting limits CC1 interprets the pulse trains as correct CAN messages according to the CAN rules and thereby to ascertain the deviations of the transmitting module from the nominal setting values. For example, the module's 203 sample point can be determined in the following way:

1. The modules 204 are disconnected from the bus, or alternatively continue in silent mode.
2. Assume that the system's bit frequency is 250 kbit/s and CC1 is set to this with the frequency 16 MHz.
3. The microcontroller 205 sets the oscillator 211 to 21.333 MHz and commands CC1 to transmit any message in which the CAN identifier starts with 1111.
4. When the microprocessor has indicated SOF, either by the level change being measured by the AD-transducer 215 or, if CC1 is of the type that generates an SOF interrupt, upon the reception of such an interrupt, it changes over CT1 into silent mode and thereafter CC1 receives its own message.
5. A pulse has gone out on the bus that represents 75% of a zero according to the CAN protocol. The CC in 203 has detected a falling edge from level 1 to level 0 and, if the level does not persist at the sample point, then no action is taken, which is now assumed to be the case.
6. After CC1 has received its own message, this is reported to the microcontroller and the conclusion can be drawn that the pulse was shorter than CC's at the 203 sample point.
7 The procedure is repeated from 3 above, but with the frequency 21 MHz.
8. The change now takes place after the sample point and the CC in 203 interprets an SOF followed by ones. When six ones have been counted, the CC in 203 transmits an error flag.
9. CC1 receives its own message, but CT1 transmits level 0 from the bus on account of the error flag transmitted by the CC in 203.
10. CC1 indicates bit error due to the error flag and reports failure of transmission to the microprocessor.
11. From what has occurred, it can be ascertained that the sample point of the CC in 203 lies between 75% and 76.2% of the bit time.

Figure 3:
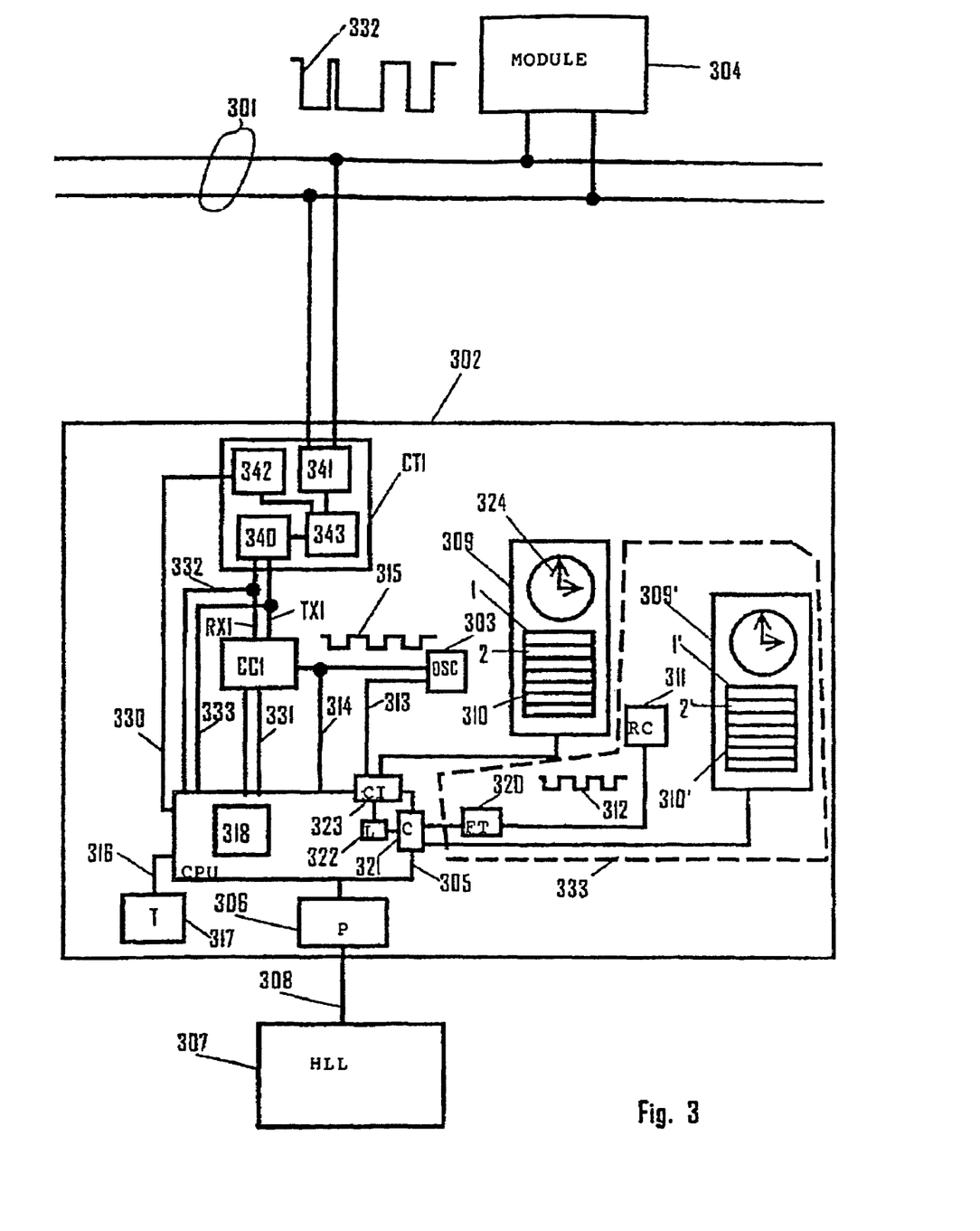
FIG. 3 shows in the form of block diagram a second embodiment of a CAN module with a number of CAN Controllers and transceivers.

FIG. 3 shows schematically a construction of a CAN module according to an embodiment. A module 302 according to this embodiment is connected to the CAN bus 301 and one or more other modules connected to the system are represented by 304. The CAN module consists of a microprocessor 305 with requisite peripherals 306. The CAN module can be connected to a high-level computer 307, for example a PC, via the connection 308, for example a USB connection. In the microprocessor arrangement there are one or more clock-functions 309, 309', each with a counter with one or more capture registers 310, 310'. The oscillator 303 is of a type with variable frequency and clocks the clock function 310. A CAN Controller CC1 is comprised in the microprocessor, or alternatively can be connected to the microprocessor, which CAN Controller CC1 is also clocked by the oscillator 303. The CC is connected to a transceiver CT1 in the usual way via the RX and TX connections. The transceiver CT1 has circuits 340 that interact with the CAN Controller, circuits 341 that interact with the CAN connection, circuits 342 that interact with the microprocessor and logic 343 for, among other things, changing between listen only mode and active mode. The transceiver has, among other things, the task of matching levels in the connection to the processing levels that apply in the processing equipment. Known transceiver types can be used, for example SN65HVD235D from Texas Instrument. The oscillator's 303 frequency can be controlled from the microprocessor via the connections 313. In addition, the microprocessor arrangement is equipped with a temperature sensor 317. The CAN system works with a nominal bit frequency, for example 250 kbit/s, which occurs commonly in practice. The well-known CAN protocol SAE J1939 works with this bit rate. The oscillator 303 can be a Dallas Maxim DS1086, which has a digitally-set fundamental frequency between 33.3 and 66.6 MHz in ranges of 5.12 MHz. Within each range, the frequency can be set in steps of 5 kHz, that is, 1024 steps giving a resolution of approx. 1 per thousand.

Example of bit rates achieved by CC1:

| Frequency MHz | Bit rate | # BTQ | ns/BTQ | μs/bit | Time resolution ns/setting step |
|---|---|---|---|---|---|
| 33.300 | 252.275 | 22 | 180.18 | 3.9639 | |
| 33.305 | 252.300 | 22 | 180.16 | 3.9635 | 0.4 |
| 33.310 | 252.350 | 22 | 180.13 | 3.9628 | 0.7 |
| 33.315 | 252.375 | 22 | 180.01 | 3.9624 | 0.4 |
| 34.000 | 246.375 | 23 | 176.47 | 4.0589 | |
| 34.000 | 250.000 | 17 | 235.29 | 4.000 | |
| 39.995 | 999.900 | 20 | 50.005 | 1.0001 | |
| 40.000 | 1000 | 20 | 50 | 1.000 | .1 |
| 40.005 | 1000.1 | 20 | 49.995 | 9.999 | .1 |
| 40.010 | 1000.2 | 20 | 49.990 | 9.998 | .1 |

The example above shows that it is possible to achieve a time resolution of parts of a nanosecond in the bit time per setting step and that, with one and the same incoming frequency, it is possible to obtain different bit times by changing the number of BTQ in the bit. It is thus possible to utilize an inexpensive variable oscillator as the one proposed for the generation of bits with small differences between them. However, the proposed oscillator has very wide tolerances, +/−0.5% for the set fundamental frequency and over 3% across the temperature range −40 to +85 C. In order to reduce the effect of these tolerances, a reference frequency 312 is introduced that can be generated by a crystal oscillator 311 and the temperature sensor 317 is introduced in order to be able to obtain the current temperature and thereby the ability to correct for temperature variations. For certain determined frequencies, there are crystal oscillators with high precision, 50 ppm and below, available at a low cost as they are used in mass-produced apparatuses such as mobile telephones, computers, clocks, etc. The oscillator 311 can advantageously be selected from such a range that the frequency is of lesser importance in comparison to the precision and the cost. The oscillator 311 clocks the clock function 309' with the fixed frequency 312 that can be broken down into a suitable frequency for the counter 310'. In a corresponding way, the variable oscillator 303 is connected to the clock function 309. The oscillator 303 clocks the CC1. The microprocessor 305 can advantageously be clocked by the oscillator 303 via the connection 314 if an internal CC is to be used, but Can be clocked in another way. The microprocessor 305 sets the oscillator's 303 outgoing frequency 315 via the connection 313. The microprocessor 305 can read off the current temperature from the temperature sensor 317 via the connection 316. In addition, data 318 has been stored in the microprocessor's memory concerning the oscillator's 311 frequency and, if required, also its temperature dependence. In order to improve the precision of the frequency 315, the frequency 312 is now utilized as the reference frequency according to the following:

The system now consists of an adjustable clock signal 315 with a poor precision, for example 0.5% and a second fixed clock signal 312 with a high precision, for example 20 ppm, that are to be set in relation to each other so that their mutual relationship is ensured and so that it is thereby possible to calibrate the oscillator 303 to a higher precision, for example 200 ppm or better. The measurement of a clock signal can be carried out in two different ways. The direct method is to measure the period of the clock signal. However, the period time of a 25 MHz clock signal is 40 nanoseconds and a measurement with a precision of 0.1% requires a resolution of 4 picoseconds, which is difficult with current technology. The second method is to count the number of clock pulses over a particular period of time and to compare the number of clock pulses according to the equation:

Clock pulses_312/
(309'_PulsesPerSecond*309'_measurement period)==

Clock pulses_315/
(309_PulsesPerSecond*309_measurement period)

If the same measurement period is used for both the frequencies, the simplified equation is obtained:

309_PulsesPerSecond==309'_PulsesPerSecond*
(Clock pulses_315/Clock pulses_312).

How the measurement is carried out depends on which type of counter and peripheral logic the implementation provides and this varies according to which type of microprocessor and peripheral logic is available. If, for example, an M32C processor from Renesans is used, then it is possible to carry out the measurement in the following way.

First it must be ensured that the clocks have a clock frequency that lies below 10 MHz as the inputs to this processor's counter cannot handle a higher frequency than this. One clock can have a higher frequency if this is also used to clock the microprocessor, as it can then be up to 32 MHz. The reference crystal 311 is assumed to have the frequency 19 MHz. The microprocessor sets the oscillator 303 to 19 MHz via the connection 313. The clock signal 312 is connected to one of the microprocessor's clock inputs 321 via the frequency transmitter 320 that halves the frequency to a permitted 9.5 MHz. By setting special logic for this input, the signal can be connected to a counter, symbolized by 310', with 16 bits. M32C has additional logic 322 that makes it possible to restart the counter when a set value has been reached or when the counter has reached its highest value, hexadecimal FFFF. When this takes place, the counter logic has a function that means that an input can change level, that is, a divided-down clock signal is obtained, relative to the Connected clock frequency. This output is thereafter connected to a second counter input 323 on M32C. For this counter, symbolized by 310, the input logic is set so that the signal is used to start and stop the counter. This counter is set in such a way that it counts the internal clock 324 that is driven by the clock signal 315. When the counter 310' that counts clock signals 312 reaches its change-over point 1', the output in 322 changes over and starts the Counting of clock signals that come from the clock signal 315 in the counter 310. Thereafter these two counters count pulses simultaneously. When the first counter has reached its change-over point 2', the output changes value and the second counter 310 stops. Thereafter the microprocessor can read off the value in the second counter 1 that can be compared directly with the first counter's Change-over point from 1' to 2'. M32C has logic that makes it possible to rescale the clock pulses 312, by dividing down the frequency before it is connected to the second counter. If the resolution is not adequate with this direct measurement, then it is possible to extend the measurement over a number of the abovementioned measurement periods by using interrupts and software.

As an alternative to using a crystal oscillator in order to generate a reference frequency, a reference frequency can be obtained from the CAN bus. In this case, a CC is used that can give a signal upon the detection of SOF, which the CC MCP2515 from Microchip can do, and in addition the module's CAN connection can be set to listen only mode, that is can receive messages, but not the signals on the bus. This can be achieved by the use of a CAN transceiver SN65HVD235D from Texas Instrument. This can be connected in an "autobaud feedback loop" whereby it forwards incoming signals to the CC's RX input but stops the CC's signals from the TX output from coming out on the bus, that is, the same as listen only mode. With the abovementioned choice of components, CT1 can be set in active or listen only mode by the processor 305 via the connection 330 and CC1 can generate an SOF pulse directly or indirectly to the clock function 309 or alternatively to the processor 305 via the connection 331. In the same way, signals on RX1 and TX1 can be connected directly or indirectly to 309 via the connections 332 and 333 respectively. The module or modules 304 connected to the CAN bus 301 are assumed to send messages symbolized by 332. The abovementioned reference frequency device 333 is now not needed. The reference frequency is obtained by the sequence described below. The current bit rate on the CAN bus 301 is assumed to be 250 kbit/s.

1. The microprocessor 305 sets the oscillator 303 to a suitable frequency for CC1 in order to obtain 250 kbit/s, for example 16 MHz, via the connection 313.

2. The microprocessor thereafter sets CC1 to the bit length 8 BTQ, 75% sample point, SJW=4 and prescaler=8, via the connection 331.

3. CT1 is set in listen only mode. Comments: With this setting, the CC1 is able to compensate for a large deviation between the transmitting CC's oscillator and its own by adjusting its bit time by up to 4 BTQ at each resynchronization.

4 When the CC1 signals SOF, the counter's 310 value is captured in capture register 1.

4.a Alternatively, the counter 310 captures each value when the connection 332 exhibits a falling edge in a capture register.

5. The microprocessor reads off and saves the captured value when it has received an SOF indication from CC1.

6. When CT1 signals a falling edge on TX1, which is forwarded to the counter 310 via the connection 332, the counter's value is captured in the capture register 2.

7. The microprocessor reads off the captured value one or several clock cycles after a falling edge has been detected on TX1.

8. When CC1 has indicated a received message to the microprocessor, it reads this off and determines, using the rules of the CAN protocol, how many clock cycles N in 309 this message would have occupied from the SOF sample point, up to the falling edge in ACK, 8.a or alternatively, the falling edge in SOF, up to the falling edge in ACK.

9. The microprocessor calculates the value M which is the difference between the values captured in the capture register 1 and the capture register 2 minus the number of pulses corresponding to 6 BTQ (the number up to the sample point in SOF), 9.a or alternatively minus 0.

10. The microprocessor obtains the reference frequency by dividing N by M.

By means of repeated measurements and calculation of average values for messages with the same CAN identifier, the frequency of a particular module on the network can be obtained. By means of measurements of messages with different CAN identifiers and calculations of average values, a virtual system frequency can be obtained.

When the oscillator 303 has been calibrated to the reference frequency, it can be set to the correct frequency in order to obtain the correct bit time for the system. Thereafter the CC1 bit-timing register is set to the values specified for the system and is thereafter ready for active signalling on the bus. The calibration is suitably repeated at different temperatures, after which temperature compensation can be carried out.

Swing

This disclosure thus makes it possible to set a module according to a CAN system specification with any bit time and low frequency deviation using simple and inexpensive standard components. As mentioned above, the requirement concerning the oscillator tolerance of the individual modules is dependent upon the system's construction and the CC's setting of bit time and SJW. There is a need to be able to verify and validate the specification. This can be carried out by utilizing the variable oscillator 303. The tolerance specified in the specification for the CAN system in question, for example 1%, is used as a starting point. The microprocessor is first set to a nominal frequency, for example 16 MHz, and a number of messages, for example 1000 messages, are received without errors. Thereafter, the microprocessor sets (16*1.05) MHz and if a number of messages, for example 1000 messages, are received correctly, the upper tolerance limit has been verified for reception. The procedure is repeated with the oscillator setting (16*0.995) MHz and if the same number of messages is received correctly, then the whole tolerance range has been verified for reception. Thereafter the procedure is repeated with the transmission of a corresponding number of messages and if they can be transmitted without the other modules generating error frames, the tolerance range has been verified. In order to validate the tolerance range, the swing is increased to, for example, +/−1.5% and the microprocessor steps up the frequency, for example in increments of 0.01%, after each 1000th received message. For each increment, the number of error frames that CC1 generates is recorded. By logging all values in a test vehicle over a long period of time and under extreme conditions, the number of error frames can be compiled as a function of the frequency and the limits for the permitted frequency deviation in the system can be validated.

Figure 4:
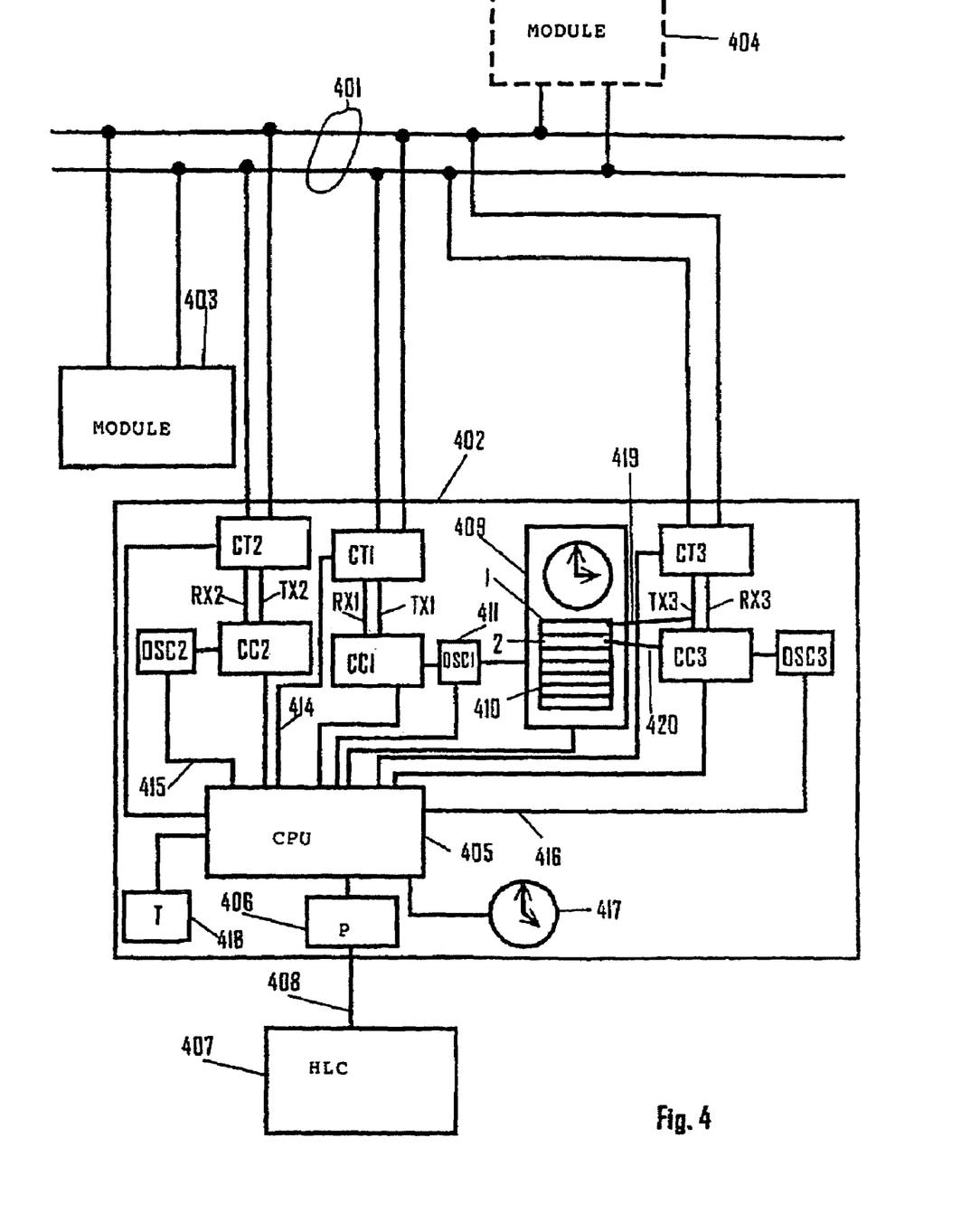
FIG. 4 shows in the form of a combined diagram and block diagram bit and structure configurations.

FIG. 4 shows an alternative embodiment of the device 402 connected to a CAN bus 401 that operates at 250 kbit/s. The module 402 has three sets of CCs, CTs and oscillators and a microprocessor 405 with requisite peripherals 406. The module is connected to a high-level computer 407, for example a PC, via the connection 408, for example USB. The microprocessor arrangement comprises a clock function 409 with a number of capture registers 410. The oscillator 411 clocks the microprocessor and the clock function. The microprocessor comprises or is connected to a CAN Controller CC1, which is also clocked by the oscillator 411. The CC is connected to a transceiver TC1 in the usual way via the RX and TX connections. The first TC can be set in active or passive mode by the processor 405 via the connection 414. In the same way, an additional two CAN Controllers and transceivers are arranged, CC2 and TC2 and CC3 and TC3 respectively. However, these are clocked by the oscillators OSC2 and OSC3 respectively. The frequency of these oscillators can be controlled from the microprocessor via the connections 415 and 416 respectively. The oscillators OSC2 and OSC3 are of variable type as described above and the oscillator 411 has a fixed frequency. In addition, the microprocessor arrangement is equipped with one or more timers, symbolized by 417, and a temperature sensor 418.

Active Detection

1. Determination of Sample Point

Figure 5:
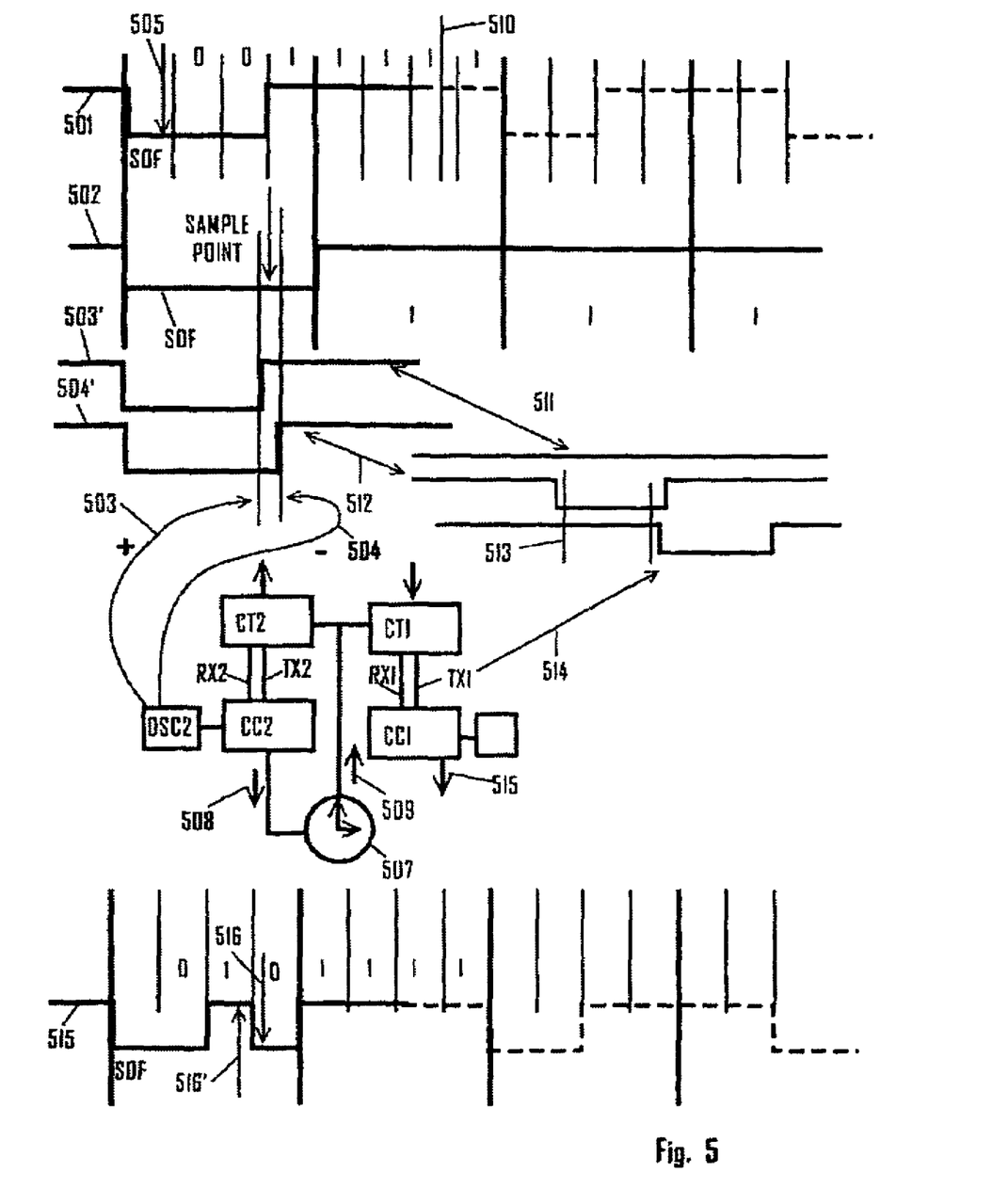
FIG. 5 shows in the form of a diagram the relationships between bit configurations.

The sample point of a target module 403 in the system is to be determined. Any other connected modules 404 are disconnected or set in a mode that ensures that none can signal actively on the bus or transmit an ACK bit or error frame, so-called silent mode. In order to determine the module's 403 sample point, CC2 is set to 1 Mbit/s with 20 BTQ and OSC2 at 40 MHz. TC1 and CC1 are set in the normal way for communication with the bit rate 250 kbit/s. The setting is not critical as CC1 will only be used for the detection of errors. CC2 is instructed to send a message with a CAN identifier that starts with 0011111. The remainder of the message is not of importance. The target module will perceive 00 as an SOF. Assume that the module had a 16 MHz clock and that it is set to 16 BTQ and 75% sample point, that is, 4 BTQ from the end. FIG. 5 shows the procedure in detail. CC1 transmits the message according to the above, which is shown by 501. The target module records an SOF and expects to read a zero according to 502. By increasing the frequency of OSC2, the pulse is made shorter so that the target module reads a one at the sample point, which is shown by 503 and 503'. The target module then interprets the falling edge as an interference and takes no action. By reducing the frequency of OSC2, the pulse is made longer (504, 504') and if the target module reads a dominant level, it will then expect zeros and ones, however at the most four consecutive zeros or five consecutive ones according to the rules for CAN. By varying the OSC2 frequency and thereby the pulse so that the target module alternately generates and does not generate an error frame within ah ever-decreasing range, the sample point of the target module can be calculated with great precision by indirectly utilizing the CC's ability to send CAN messages. However, it is necessary for signals from CC2 to be prevented from going out on the bus after the pulse has been generated and CC1 must not be able to read the bus until after the pulse has died away. This is achieved by CT2 being set in active mode and CT1 being disconnected from the bus before the procedure is started. When CC2 detects it own sample point 505 in its own SOF, it triggers the timer 507 by the signal 508. This is set to approximately 7 µs. When the time has expired, the signal 509 is generated that disconnects CT2 from the bus and connects in CT1, whereby CT modes are utilized indirectly by the change-over taking place during the course of the CAN signalling. The change-over is shown by 510. This results in CC1 reading the bus as recessive (511) if the pulse is shorter than the sample point of the target system, but if the pulse is longer than the sample point of the target module, then there will be an active error flag after the target module has detected six recessive bits (512). CC1 will detect this as an SOF (513) and after five consecutive bits it will generate an active error flag 514. This event generates an interrupt 515 to the microprocessor, either or both of the SOF and active error flag being dependent upon the characteristics and setting of CC1, that thereby has information for indirectly determining the sample point of the target module according to the method described. Thus, using CC1, the microprocessor can detect whether the target system is transmitting an active error flag or not. The error handling specified in CAN is used indirectly to measure the sample point.

Improved Precision

In the method described above, the sample point is determined using a rising edge. As it is a passive edge, its gradient depends upon the termination and capacitance of the bus. A falling edge is actively driven and therefore steeper. Once the sample point is approximately known, its position can be determined with greater precision if a falling edge is input. We now let the CAN identifier of the transmitted message start with 0101111 which generates a double pulse 515. The message is sent with the same bit rate as before. If no error is detected, then the sample point 516 of the target module lies at the zero. If an error is detected, the sample point lies at the one, which is shown by 516'. The sample point is input by increasing the bit time if an active error flag is generated and by reducing the bit time if there is no active error flag. By means of a gradually reducing range, the sample point is determined.

Determination of the Bit Rate of the Target Module

Figure 6:
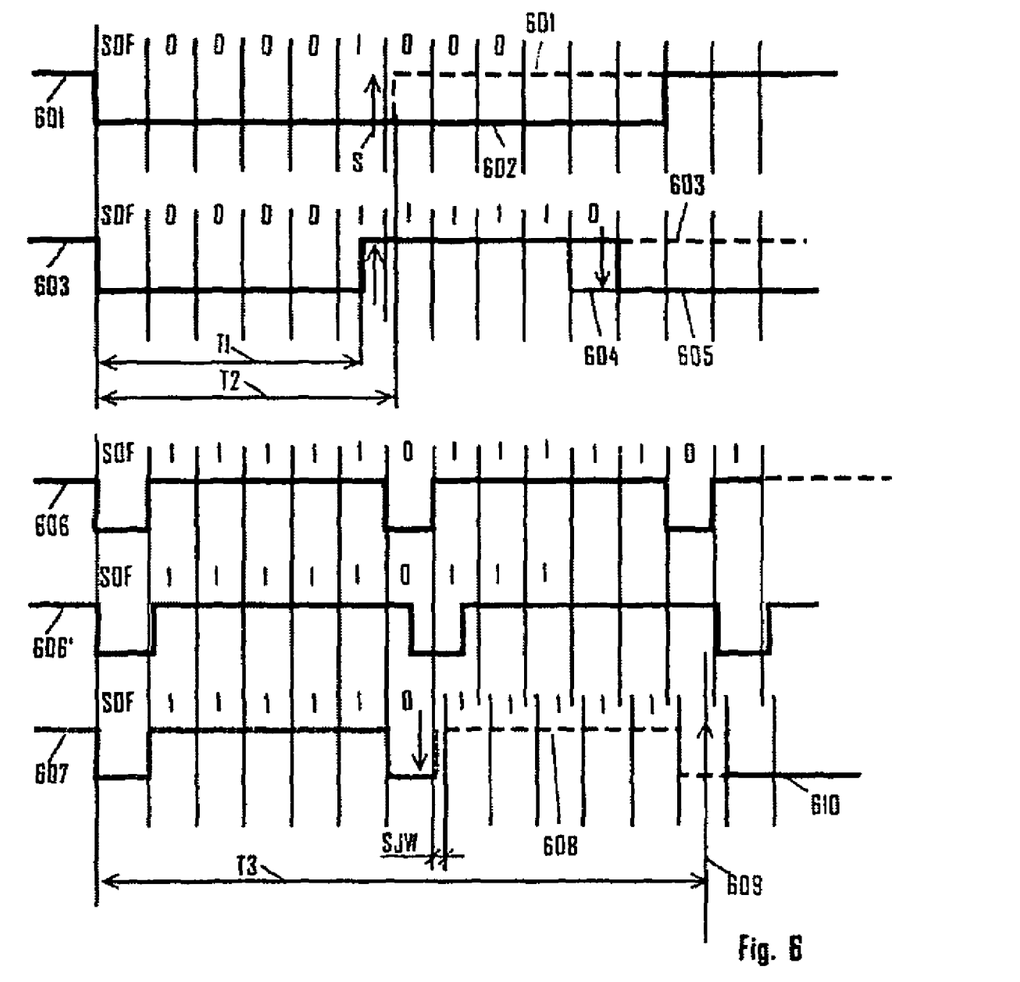
FIG. 6 shows in the form of a diagram additional relationships between bit constellations.

In order to determine the bit rate of the target module, OSC2 and CC2 are utilized to generate a pulse that is perceived by the target module alternately as the introduction to a message with the CAN identifier 00001x and as a message with the CAN identifier 00000x where a bit-stuffing error arises. FIG. 6 shows such pulses. In the former case, the target module will send an error frame after it has counted five recessive bits, while in the latter case, it does so immediately after it has detected the incorrect bit stuffing bit. This makes it possible to measure the bit rate of the target system by basically the same method as described above for measuring the sample point by indirect utilization of the CAN specification's definition of bit, stuffing bit, message and error handling. When the sample point of the target module has been determined, it is possible to obtain a measurement of the highest possible bit rate which is 25/23-parts of the sampling time. It can be expedient to set CC2 and OSC2 to obtain a bit time that is 4/3 parts of the measured time. Using the method described above, a pulse is generated with the length of five bit times. The pulse 601 has become longer than the sum of SOF, four consecutive bits and the time to the sample point S according to the target module's CC, so that this generates an active error flag 602 due to a stuffing error in the next bit. The pulse 603 is, on the other hand, too short, so the target module's CC reads a one after four zeros. After having read another four ones, it expects a zero 604, but reads a one and so generates an active error flag 605. The sample point S of the target module has thus been locked in between the pulse lengths T1 and T2. By gradually reducing the difference between T1 and T2, the time from the falling edge in SOF to the sample point S can be determined. The bit time $T_{bm}$ of the target module is given by the equation $$T_{bm}=(5*T_b-T_{sm})/5,$$

where $T_b$ is the bit time for CC2 and $T_{sm}$ is the target module's time to the sample point. As no falling edge has been generated by the pulse, the target module has never been resynchronized.

Determination of SJW

SJW determines the maximum adjustment of the bit time that a receiving module can carry out. By setting CC2 to send a message with the CAN identifier starting with eleven ones, it will send out the bit sequence 01111101111101, that is the triple pulse 606. By increasing the bit time in CC2, the triple pulse 606' is achieved. The target module expects the appearance of 607 but as the falling edge does not come until immediately before the sample point, it resynchronizes with SJW and expects the continued pattern 608. At the sample point 609 a zero is expected but a one is read and so an active error flag 610 is sent out. By shortening the triple pulse time, the target module can receive the message correctly. In this way, the sampling time 609 has been input and can be measured indirectly by varying CC2's bit time. When the time T3 from SOF to the sample point 609 has been determined, the SJW time can be obtained by the equation $$T_{SJW}=T3-(12*T_{bm}+T_{sm})$$

Determination of Signal Delay

Figure 7:
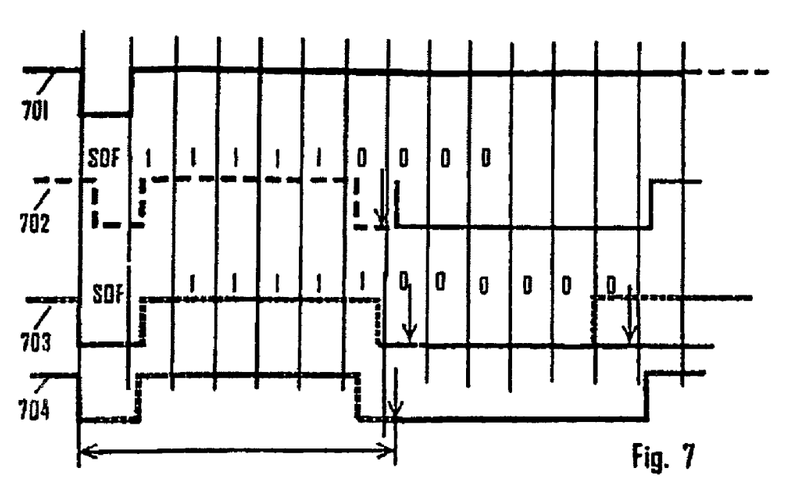
FIG. 7 shows in the form of block diagram an embodiment that is modified in relation to the embodiment according to FIG. 3.

The signal delay between the target module and the measurement module can be measured simply in the following way. CC2 is set to send a message that starts with the CAN identifier 111111x, that is a stuffing bit is necessitated. After the SOF has been generated, CT2 disconnects TX2 from the bus and the pulse 701 in FIG. 7 is generated. CC3 reads the bus and detects SOF. After six consecutive ones have been read, an active error flag is generated. The target module does likewise, but later due to the signal delay. The bit time in CC3 is now lengthened so that it does not generate an error frame but reads the active error flag as the start of a legal dominant bit. 702 shows how the target module generates an active error flag and 703 shows how CC3 interprets this as a dominant bit. By shortening CC3's bit time, it will detect a stuffing bit error immediately before the change-over from the target module's active error flag has reached it. In this way, the falling edge from the target module can be delimited. By adjusting CC3's bit length to the change-over point between immediate error frame generation and after five consecutive bits, the falling edge of the target module can be measured. The signal delay $T_{sjw}$ can now be obtained from the equation $$T_{sjw}=(6*T_{b3}+T_{s3})-(6*T_m+T_{sm})$$

where $T_{b3}$ is CC3's bit time and $T_{s3}$ is its sampling time and $T_m$ is the target module's bit time and $T_{sm}$ is its sampling time.

Calibration of CC2 and CC3

The methods described above assume that the bit times of CC2 and CC3, that is OSC2 and OSC3, are calibrated against a reference. The oscillator 211 is used as a reference. CC1 is set for a given bit rate, for example 250 kbit/s and the sample point is set to 75% of the bit time. Using the method that has been described for measuring the target module's bit rate, CC1's bit rate is now measured with CC2 and CC3. Alternatively, CC1's sample point is measured by the method described and thus a value is obtained directly for the modulating voltages of OSC2 and OSC3 respectively in order to obtain a bit length for 250*0.75=187.5 kbit/s. Each oscillator drifts with the temperature. The current temperature for the calibration is measured by the temperature sensor 418. By recalibrating at different temperatures, a temperature compensation can be calculated. All measurements can now be carried out with the oscillator 411 as reference. This can, in turn, be calibrated to an external reference according to the methods described in the Swedish patent applications SE 0401922-0 and SE 0401130-0.

In order to keep the respective CCs in active error mode, a number of messages that are perceived as correct can be transmitted occasionally in order to enable the error counters to Count down according to the rules of the CAN protocol.

Alternative Construction and Calibration

Figure 8:
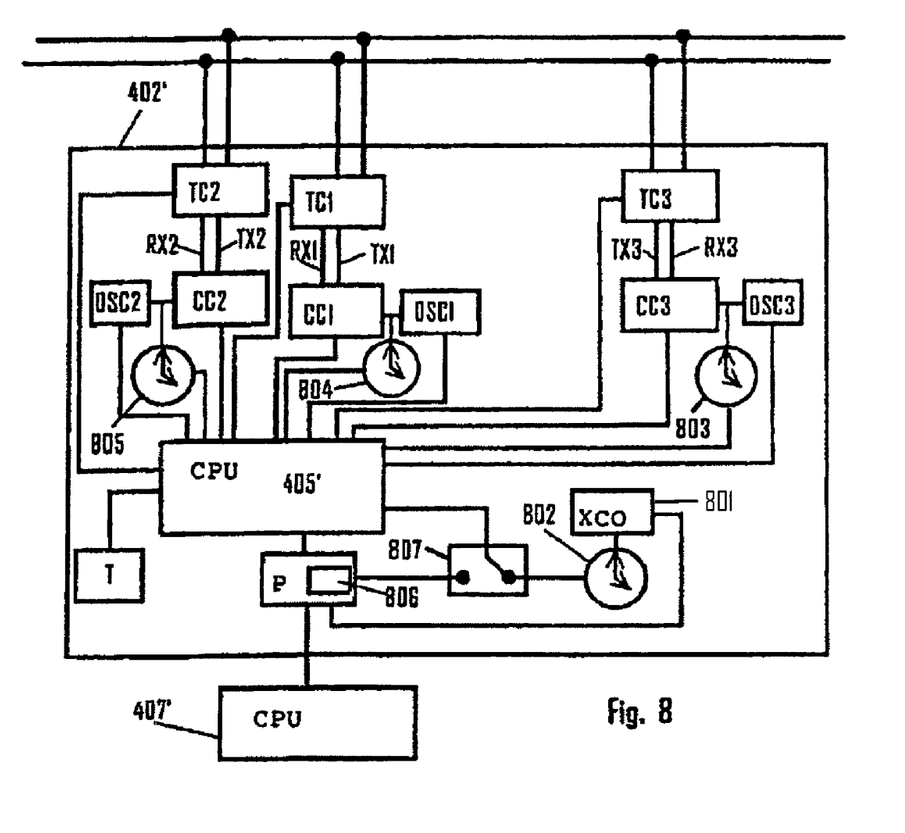
FIG. 8 shows in the form of block diagram an embodiment that is further modified in relation to the embodiment according to FIG. 3.

FIG. 8 shows an alternative construction. The crystal 411 has been replaced by a variable oscillator OSC1 that clocks the CPU 405' and CC1. A reference crystal oscillator 801 of good quality, for example 16 MHz with 20 ppm precision or 12 MHz and 50 ppm precision, has been introduced. Counters 802, 803, 804 and 805 are connected to this and to the respective OSCs, which counters can all be started and stopped simultaneously by the CPU 405', or alternatively there can be capture registers that can be frozen simultaneously. The oscillator 801, that works with a fixed frequency, can be used to clock peripherals that preferably work with a fixed frequency, for example communication circuits 806 for the communication with the high-level computer 407'. By simultaneously counting the pulses from 801 and the respective OSCs over one and the same time, the frequency of the OSCs can be set in relation to the reference frequency from 801. Thereby the CPU 405' has a tool for setting the respective OSCs to any frequency within their frequency range with a given precision in relation to the reference frequency 801. In this way, a local time base has been established. Many CPUs incorporate one or more CCs that are clocked with the same base frequency as the CPU itself. If the base frequency is fixed, this limits the possibilities for adapting ah incorporated CC to a suitable bit rate and sample point in a CAN system that works with a different fundamental frequency. As OSC1 can here be adjusted, an incorporated CC1 can also advantageously be used. The local time base may need to be matched to the high-level computer 407'. If the communication between 402' and 407' uses a protocol that is based on synchronous time slots given by the high-level computer, for example USB, then its start-of-frame pulse can be utilized by counting the oscillator's 801 pulses during a timeslot. A change-over unit 807 is caused by the CPU 405' to connect in SOF pulses from the USB unit 806 that start and stop the counter 802, or alternatively freeze its capture register. In this way, the number of pulses that 801 generates during a timeslot is obtained.

Passive Monitoring

The previously-described methods assume that only one target module is Connected at a time and that active signalling can be used. Many times this is not possible or desirable. A method of indirectly utilizing the characteristics of the CAN controllers and the CAN protocol for measuring quality can be carried out as described below:

The CC1 in FIG. 4 is set to the system's nominal bit rate. The CC2 is varied in steps towards a lower bit rate and the CC3 is varied towards a higher bit rate. Each CC is allocated two capture registers in 409. The time is captured at SOF and at the ACK bit or locally generated error frame. All the CTs are set so that listening on the bus can take place, but not transmission. CC3's output TX3 is connected to capture register 1 by the connection 419. When CC3 activates TX3, the time is frozen in capture register 1. In this way, the time is captured for a generated ACK bit or active error flag. The capture register 2 is connected to CC3's SOF signal by the connection 420. In this way, each falling edge on the bus that CC3 perceives as a SOF is captured. CC1 and CC2 are connected in a corresponding way to their respective capture registers. After each message detected by CC1 or each error frame generated by CC1, the microprocessor preferably reads off the following values:

Temperature
For each CC:
Time of SOF
Time of ACK or error frame
TSEG_1 and TSEG_2
Prescaler
SJW
Oscillator frequency
The CAN identifier
The RTS bit
DLC
Received bit pattern in the receive buffer
TEC
REC
Error status registers These are sent to the high-level computer 407 via the connection 408. The high-level computer logs the messages that have been sent. At predetermined intervals, for example each second, the high-level computer commands the microprocessor 405 to reduce the bit time by a certain amount, for example 0.1% in CC2 and to increase CC3 by the same amount. With increased deviation, CC2 and CC3 will generate error frames for certain messages while CC1 receives a correct message. Utilizing the SOF and ACK time stamps, it can be ascertained whether there is a slot larger than three bit times between a message and the subsequent message. If such is the case, no arbitration and hence no resynchronization has been carried out at the transmitter. By seeing at which bit times in CC2 and CC3 error frames start to be generated for a given CAN identifier, it can be determined by how much the transmitting module's bit time deviates in relation to the measurement module. The bit rate of the transmitting module is the average of CC2's and CC3's bit rates at which error frames start to appear if CC2 and CC3 have the same SJW, preferably one BTQ. As each message with DLC differing from zero has only one sender, the bit rate of each module in the system can be determined. By continually monitoring a system in this way, variations in the respective modules can be measured and related to different operating situations and the limits for serious interference can be extrapolated.

Determination of Message Length

The length of a CAN message varies with the transmitting module's oscillator frequency and setting, resynchronization upon arbitration and the number of stuffing bits. A CC, for example CC3, is set to the nominal bit rate for the CAN system and CT3 is set in a mode where it does not actively participate in the communication with transmission, for example Autobaud feedback loop in the case of T1 235. At the SOF signal in CC3, the value of the clock 409 is captured via 419 and the ACK bit is captured via 420 in the clock's capture register 410. The length $t_1$ of the message is given by $$t_1 = T_{s3} + (t_{ACK} - t_s) + 9 * T_{b3}$$

where
$T_{s3}$ sampling time in CC3
$T_{ACK}$ the clock's time at the ACK bit
$t_s$ the clock's time at the sample point in SOF
$T_{b3}$ the bit time according to CC3

The number of stuffing bits can be calculated after reception by applying the rules of the CAN protocol and hence also the total number of bits B in the message. As the time stamping was carried out at the falling edge of the ACK bit and this is followed by 8 bits, the bit rate $T_b$ of the transmitting module can be determined with great precision by $$T_b=[T_{s3}+(t_{ACK}-t_s)]/(B-9)$$

Figure 9:
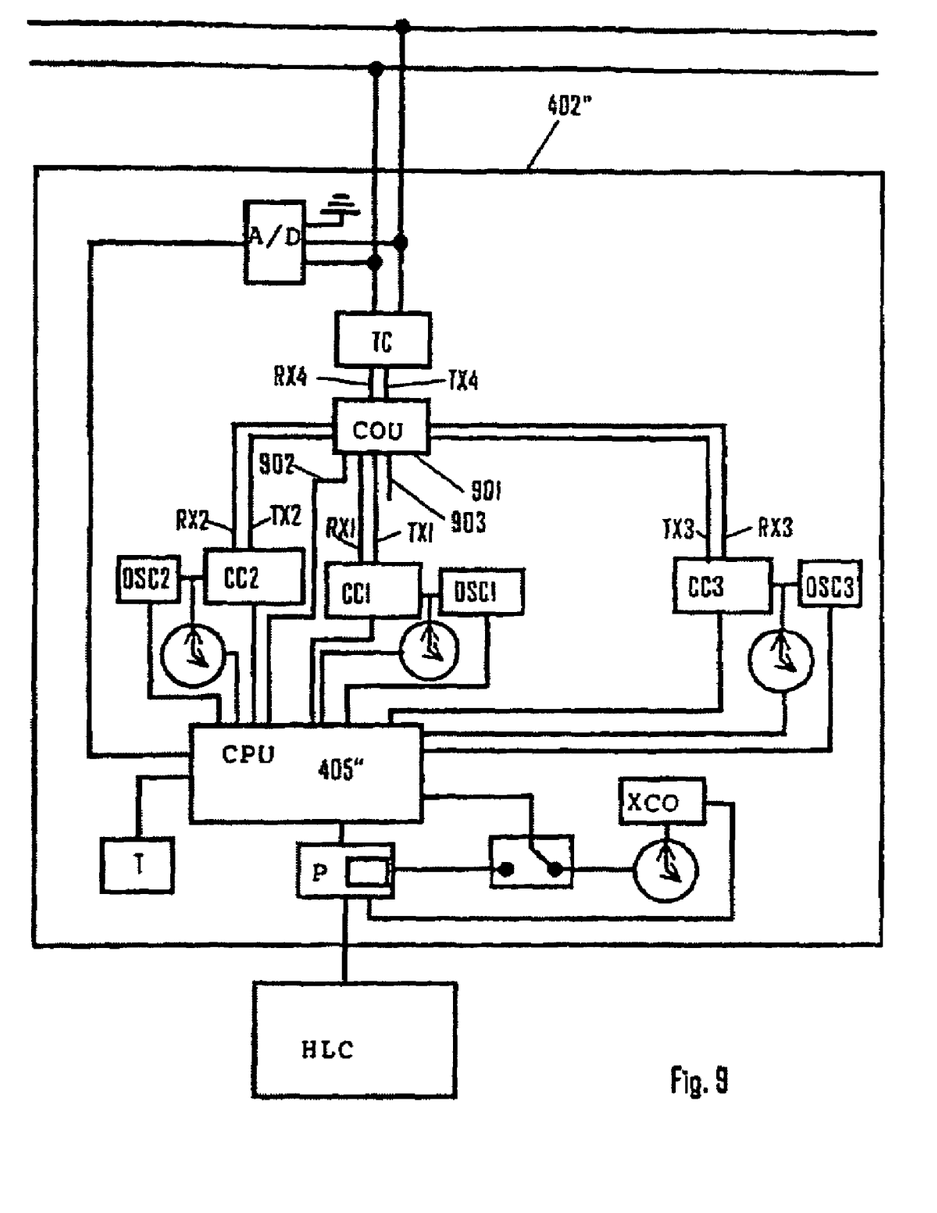
FIG. 9 shows in the form of block diagram a third embodiment.

FIG. 9 shows one of several alternative hardware constructions. One or more CCs are connected to a change-over unit 901 that is controlled by the CPU 405" via the connection 902. The CPU can switch the TX connection from the respective CC from connection to TX4 to CC's own input RX, to a different CC's RX, to a trigger output 903 connected to suitable target, for example a capture register or CC's mode switching, or can disconnect it completely. The respective CC's RX connection can be connected to RX4, to one or more other CCs' TX or can be disconnected completely. In this way, different configurations for different purposes can be achieved in a simple way. In addition, CCs with different characteristics can be connected in parallel, which can be advantageous. For example, MCP2515 can generate an SOF signal, a characteristic that the internal CCs in the microprocessor M16C from Mitsubishi does not possess. The latter has ah advanced error register whereby conclusions can be drawn regarding the type of error and where in the message it was discovered, a characteristic that the former CC does not possess. By connecting their RX connections jointly to RX4, more information can be obtained concerning a corrupt message on the bus.

Automatic adaptation to current bit rate in a system.

The method for measuring the length of a message as described above can be utilized for automatic adaptation to the current bit rate in a system. The length of received messages is measured using a counter connected to OSC3. The counter is started by SOF and is stopped by ACK. The number of pulses that is thus counted gives the raw length of the message up to the acknowledgement bit in the pulses. The received message is converted according to the rules in the CAN protocol so that the number of bits up to the acknowledgement bit is obtained and is multiplied by the number of pulses from OSC3 that result in a bit. If the number of bits is the same, then the module has the correct frequency in relation to the transmitting module. If the number of its own pulses is higher, OSC3's frequency is to be reduced and vice versa if the number is lower. By repeating the measuring for messages from several modules in the system prior to correction and by taking an average of the result, adaptation can be carried out to a fictitious average bit length in the system. In this way, a module can interact with other modules in a reliable way, even if its own oscillator has wide tolerances.

This disclosure is not limited to the embodiments described above, but can be modified within the framework of the following patent claims and inventive concept described above.

The invention claimed is:

1. A device comprising:
a processing device configured to determine at least one characteristic of at least one CAN module;
an oscillator configured to generate a number of different frequencies in response to directions from the processing device;
a transceiver configured to communicate through a communication bus with the at least one CAN module;
a Controller Area Network (CAN) controller operatively coupled to the oscillator, the transceiver, and the processing device;
wherein the processing device is configured to receive a reference frequency and is configured to compare an oscillator frequency to the reference frequency to adapt the CAN controller to any CAN bit time based on the characteristics of the at least one CAN module.

2. The device of claim 1, wherein the CAN controller is configured to receive levels (zeros and ones) appearing on the bus connection and the CAN controller is configured to detect transitions between the levels.

3. The device of claim 1, further comprising means for measuring deviations between bit times in messages received from the at least one CAN module connected to the communication bus.

4. The device of claim 1, further comprising a counter configured to receive the plurality of frequencies generated by the oscillator, wherein the processor is configured to clock the counter according to the reference frequency.

5. The device of claim 4, further comprising an internal oscillator configured to generate the reference frequency.

6. The device of claim 4, wherein the processor is configured to determine the reference frequency from a CAN message received at the CAN controller.

7. The device of claim 1, wherein the CAN Controller is connected to the transceiver via a transmission connection and a reception connection, and wherein the transceiver is coupled to the communication bus via a CAN High Connection and a CAN Low Connection.

8. The device of claim 7, wherein the processing device is configured to set the transceiver for either an active or a passive function.

9. The device of claim 1, further comprising means for generating pulses and pulse trains according to a selected CAN bit time.

10. The device of claim 1, further comprising means for receiving pulse trains from the at least one CAN module and determining, by means of the pulse trains, within which setting limits the at least one CAN module interprets the pulse trains as correct CAN messages according to rules of the CAN system.

11. The device of claim 1, further comprising means for determining that a particular sample point is located within a certain time period of a bit time by the indication of an error flag due to a bit error.

12. The device of claim 1, wherein the processing device is configured to obtain a clock frequency of the oscillator indirectly from a particular message on the communication bus by measuring a number of clock cycles that the particular message takes up from Start Of Frame to an acknowledgement bit.

13. The device of claim 1, further comprising means for validating limits for a frequency deviation by compiling a number of error frames as a function of frequency.

14. The device of claim 1, wherein the processing device is configured to determine at least one characteristic of at least one CAN module comprising sample point, bit rate, frequency swing tolerance, synchronization jump width, signal delay, or message length.

15. A method, comprising:
selecting a clock frequency to be generated by a variable frequency oscillator for use by a first Controller Area Network (CAN) module on a bus connection;
determining a bit rate for communicating with the first CAN module on the bus connection;
transmitting at least one message over the bus connection to a second CAN module;
receiving at least one message over the bus connection at a CAN controller of the first CAN module;

determining a characteristic of the bus connection with respect to the clock frequency based at least in part on the at least one message received;

adjusting a transmission characteristic used by the CAN controller for the first CAN module over the bus connection based on the characteristic of the bus connection.

16. The method of claim 15, further comprising:
wherein the transmitting at least one message further comprises the CAN controller sending the message according to a CAN protocol.

17. The method of claim 16, further comprising disabling transmissions from the CAN controller after the sending.

18. The method of claim 15, further comprising:
adjusting the clock frequency in at least one incremental step away from a nominal frequency;
determining a number of received error messages from the bus connection at the first CAN module.

19. The method of claim 15 further comprising:
determining a reference frequency according to a number of pulses generated by the variable frequency oscillator before receiving the at least one message.

20. The method of claim 19, further comprising:
capturing a time associated with sending a start of frame message;
capturing a time associated with the receiving of an acknowledge bit associated with the start of frame message.

21. The method of claim 15, wherein determining a characteristic further comprises determining a bit quanta setting.

22. The method of claim 15, further comprising selecting a second clock frequency to be generated by a second variable frequency oscillator of the first CAN module, wherein a second CAN controller determines a bit rate for communicating on the bus connection.

23. The method of claim 16,
wherein the transmitting at least one message further comprises transmitting a series of digital ones, and
wherein the selecting a clock frequency to be generated further comprises selecting a clock frequency corresponding to a length of time associated with a sample point at the second CAN module.

24. The method of claim 16,
wherein the transmitting at least one message further comprises transmitting a series of digital ones, and
wherein the selecting a clock frequency to be generated further comprises selecting a clock frequency corresponding to a length of time necessary for the message to cause a bit stuffing error at the second CAN module.

25. The method of claim 16 wherein the selecting a clock frequency further comprises selecting a clock frequency corresponding to outer bounds of a tolerance range.

26. An article of manufacture including a non-transitory memory medium, readable by a computing device, having instructions stored thereon that cause the computing device to perform operations comprising:
selecting a clock frequency to be generated by a variable frequency oscillator for use by a first Controller Area Network (CAN) module on a bus connection;
determining a bit rate for communicating with the first CAN module on the bus connection;
transmitting at least one message over the bus connection to a second CAN module;
receiving at least one message over the bus connection at a CAN controller of the first CAN module;

determining a characteristic of the bus connection with respect to the clock frequency based at least in part on the at least one message received;
adjusting a transmission characteristic used by the CAN controller for the first CAN module over the bus connection based on the characteristic of the bus connection.

27. The article of manufacture of claim 26, further having instructions stored thereon that cause the computing device to perform operations comprising:
adjusting the clock frequency in at least one incremental step away from a nominal frequency;
determining a number of received error messages from the bus connection at the first CAN module.

28. The article of manufacture of claim 26, further having instructions stored thereon that cause the computing device to perform operations comprising:
determining a reference frequency according to a number of pulses generated by the variable frequency oscillator before receiving the at least one message.

29. The article of manufacture of claim 28, further having instructions stored thereon that cause the computing device to perform operations comprising:
capturing a time associated with sending a start of frame message;
capturing a time associated with the receiving of an acknowledge bit associated with the start of frame message.

30. The article of manufacture of claim 29, further having instructions stored thereon that cause the computing device to perform operations comprising: selecting a second clock frequency to be generated by a second variable frequency oscillator of the first CAN module, wherein a second CAN controller determines a bit rate for communicating on the bus connection.

31. An apparatus, comprising:
means for selecting a clock frequency to be generated by a variable frequency oscillator for use by a first Controller Area Network (CAN) module on a bus connection;
means for determining a bit rate for communicating with the first CAN module on the bus connection;
means for transmitting at least one message over the bus connection to a second CAN module;
means for receiving at least one message over the bus connection at a CAN controller of the CAN module;
means for determining a characteristic of the bus connection with respect to the clock frequency based at least in part on the at least one message received;
means for adjusting a transmission characteristic used by the CAN controller for the first CAN module over the bus connection based on the characteristic of the bus connection.

32. The apparatus of claim 31, further comprising:
means for adjusting the clock frequency in at least one incremental step away from a nominal frequency;
means for determining a number of received error messages from the bus connection at the first CAN module.

33. The apparatus of claim 31, further comprising:
means for determining a reference frequency according to a number of pulses generated by the variable frequency oscillator before receiving the at least one message.

34. The apparatus of claim 33, further comprising:
means for capturing a time associated with sending a start of frame message;
means for capturing a time associated with the receiving of an acknowledge bit associated with the start of frame message.

35. The apparatus of claim 31, further comprising means for selecting a second clock frequency to be generated by a second variable frequency oscillator of the first CAN module, wherein a second CAN controller determines a bit rate for communicating on the bus connection.

36. A Controller Area Network (CAN) system comprising a plurality of CAN modules, individual ones of the CAN modules comprising:
- a processing device configured to determine at least one characteristic of at least one CAN module;
- an oscillator configured to generate a number of different frequencies in response to directions from the processing device;
- a transceiver configured to communicate through a communication bus with at the at least one CAN module;
- a CAN controller operatively coupled to the oscillator, the transceiver, and the processing device;
- wherein the processing device is configured to receive a reference frequency and is configured to compare an oscillator frequency to the reference frequency to adapt the CAN controller to any CAN bit time based on the characteristics of the at least one CAN module.

* * * * *

UNITED STATES PATENT AND TRADEMARK OFFICE
CERTIFICATE OF CORRECTION

| | |
|---|---|
| PATENT NO. | : 7,934,039 B2 |
| APPLICATION NO. | : 12/267190 |
| DATED | : April 26, 2011 |
| INVENTOR(S) | : Fredriksson et al. |

It is certified that error appears in the above-identified patent and that said Letters Patent is hereby corrected as shown below:

Column 1, line 4, below "Title" insert -- CROSS-REFERENCE TO RELATED APPLICATIONS --.

Column 17, line 20, in Claim 19, delete "claim 15" and insert -- claim 15, --.

Column 17, line 52, in Claim 25, delete "claim 16" and insert -- claim 16, --.

Signed and Sealed this
Seventeenth Day of January, 2012

David J. Kappos
*Director of the United States Patent and Trademark Office*